United States Patent
Gates

(10) Patent No.: US 7,230,182 B1
(45) Date of Patent: Jun. 12, 2007

(54) WALL PLATE FOR A LOCKING RECEPTACLE

(75) Inventor: Brian C. Gates, Marcellus, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 11/263,100

(22) Filed: Oct. 31, 2005

Related U.S. Application Data

(60) Provisional application No. 60/624,242, filed on Nov. 2, 2004.

(51) Int. Cl.
*H02G 3/14* (2006.01)

(52) U.S. Cl. .................. 174/66; 439/538; 439/535

(58) Field of Classification Search ............ 439/535, 439/553, 539, 538, 543, 544; 174/66, 67
See application file for complete search history.

(56) References Cited

U.S. PATENT DOCUMENTS

| | | | | |
|---|---|---|---|---|
| 1,596,966 A | * | 8/1926 | Kempton | 439/535 |
| 1,636,278 A | * | 7/1927 | Benjamin | 439/313 |
| 4,029,953 A | * | 6/1977 | Natoli | 362/382 |
| 5,256,077 A | * | 10/1993 | Mattingly et al. | 439/314 |
| 5,477,010 A | * | 12/1995 | Buckshaw et al. | 174/67 |
| 5,577,929 A | * | 11/1996 | Sawada | 439/336 |
| 6,051,785 A | * | 4/2000 | Baldwin et al. | 174/54 |
| 6,450,834 B1 | * | 9/2002 | Polgar et al. | 439/546 |
| 6,476,319 B1 | * | 11/2002 | Shemtov | 174/65 R |
| 6,508,666 B1 | * | 1/2003 | Francis | 439/548 |
| 6,679,725 B2 | * | 1/2004 | Kidman | 439/536 |
| 6,710,248 B1 | * | 3/2004 | Foschino et al. | 174/65 R |
| 6,770,815 B1 | * | 8/2004 | Shotey et al. | 174/66 |

* cited by examiner

*Primary Examiner*—Tulsidas C. Patel
*Assistant Examiner*—Harshad C Patel
(74) *Attorney, Agent, or Firm*—Daniel P. Malley; Bond, Schoeneck & King, PLLC

(57) ABSTRACT

The present invention is directed to a wall plate for covering a locking receptacle. The locking receptacle includes a base member. The base member includes a raised portion having a user-accessible receptacle and at least one locking tab disposed in a side portion thereof. The base member also includes a mounting strap. The wall plate includes a plate member having an aperture disposed therein. The aperture is sized to accommodate the raised portion. A notch is disposed at a predetermined position along a periphery of the aperture. The notch is sized to accommodate the at least one locking tab, whereby the user-accessible receptacle and the at least one locking tab are accessible to a user and the base member and the mounting strap are covered by the plate member and not accessible to a user.

23 Claims, 2 Drawing Sheets

WALL PLATE FOR A LOCKING RECEPTACLE

CROSS-REFERENCE TO RELATED APPLICATIONS

This application claims the benefit of priority under 35 U.S.C. § 119(e) to U.S. Provisional Patent Application Ser. No. 60/624,242, filed on Nov. 2, 2004, the content of which is relied upon and incorporated herein by reference in its entirety.

BACKGROUND OF THE INVENTION

1. Field of the Invention

The present invention relates generally to wall plates, and particularly to wall plates for locking receptacles.

2. Technical Background

Electrical receptacles are employed to provide current to an electrical cord through the connection with a male plug having male metal prongs. The prongs of the plug are typically secured by the friction between the prongs and the receptacle contacts. However, frictional connections have safety drawbacks. In particular, the receptacle may conduct electricity to the prongs of the male plug when the prongs are only partially inserted into the receptacle. This represents a significant safety hazard to an individual who comes into contact with the exposed, and energized, metal prongs. This scenario may readily materialize because the prongs of conventional plugs may be easily withdrawn from the receptacle sockets by, for example, an unintentional or inadvertent tug on the electrical cord. Receptacle outlets may also pose the danger of electrical shock by accidental contact with the blades of the plug as it is inserted into the live receptacle outlet terminals.

In one approach, various plug/receptacle arrangements have been considered that inhibit or prevent withdrawal of the plug from the outlet. For example, one connector set employs having a central protrusion, independent of the receptacle blades, that is needed to achieve mating with the receptacle. In another approach, the plug is equipped with arcuate prongs that are inserted into and rotated about a corresponding female receptacle to lock projecting portions of the prongs under retaining ledges defined by the receptacle.

Heretofore, the main cover option for locking receptacles, such as the California Standard 50 A Turnlok receptacle, was a weatherproof cover. While the weatherproof cover is a solid solution, users do not always need a weatherproof cover and there has been constant inquiries regarding a lower cost option. In one approach, a standard wall plate was considered. The plate featured a 2" diameter hole to accommodate the receptacle and included screw holes for wall box mounting. The drawback to this approach relates to the presence of two lock tabs on the outside of the receptacle neck. The lock tabs protrude approximately $1/16^{th}$ inch. Unfortunately, the receptacle outer lock tabs prevented the cover from sliding onto the receptacle. Accordingly, there is a growing demand from distributors and end users for a wall plate that is more suitable for such receptacles.

What is needed is a wall plate cover that suitably fits locking receptacles. In particular, what is needed is a wall plate cover that includes a notch configured to accommodate the lock tabs such that the wall plate cover may easily slide onto the receptacles.

SUMMARY OF THE INVENTION

The present invention is directed to a wall plate for covering a locking receptacle having at least one locking tab. The plate includes a plate member having a hole disposed therein. The hole is sized to accommodate the locking receptacle. A notch is disposed at a predetermined position at a periphery of the hole. The notch is sized to accommodate the at least one locking tab.

One aspect of the present invention is directed to a wall plate for covering a locking receptacle. The locking receptacle includes a base member. The base member includes a raised portion having a user-accessible receptacle and at least one locking tab disposed in a side portion thereof. The base member also includes a mounting strap. The wall plate includes a plate member having an aperture disposed therein. The aperture is sized to accommodate the raised portion. A notch is disposed at a predetermined position along a periphery of the aperture. The notch is sized to accommodate the at least one locking tab, whereby the user-accessible receptacle and the at least one locking tab are accessible to a user and the base member and the mounting strap are covered by the plate member and not accessible to a user.

In another aspect, the present invention is directed to an electrical assembly that includes a locking receptacle. The locking receptacle includes a base member. The base member includes a raised portion having at least one user-accessible receptacle disposed therein and at least one locking tab disposed in a side portion thereof. The base member also includes at least one terminal member and a mounting strap. The assembly also includes a wall plate comprising a plate member having an aperture disposed therein. The aperture is sized to accommodate the raised portion. A notch is disposed at a predetermined position along a periphery of the aperture and sized to accommodate the at least one locking tab. The wall plate is mounted to the locking receptacle by inserting the at least one locking tab into the notch and rotatably aligned with the locking receptacle such that the at least one user-accessible receptacle is disposed within the aperture and accessible to a user and the base member and the mounting strap are not accessible to the user.

In yet another aspect, the present invention is directed to a method for mounting a wall plate to a locking receptacle. The method includes mounting a locking receptacle to a structure. The locking receptacle includes a base member with a raised portion. The raised portion has at least one user-accessible receptacle disposed therein. The raised portion also includes a first locking tab and a second locking tab disposed at separate locations in a side portion of the neck member. The base member includes a mounting strap for connection to the structure. A wall plate is provided. The wall plate includes a plate member having an aperture disposed therein and a notch disposed at a predetermined position at a periphery of the aperture. The aperture being sized to accommodate the raised portion. The notch is sized to accommodate the plurality of locking tabs. The first locking tab is inserted into the notch. The wall plate is rotated until the notch is aligned with the second locking tab. The second locking tab is inserted into the notch such that the neck portion is disposed within the aperture, whereby the user-accessible receptacle is accessible to a user and the base member and the mounting strap are covered by the plate member and not accessible to a user.

Additional features and advantages of the invention will be set forth in the detailed description which follows, and in } part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
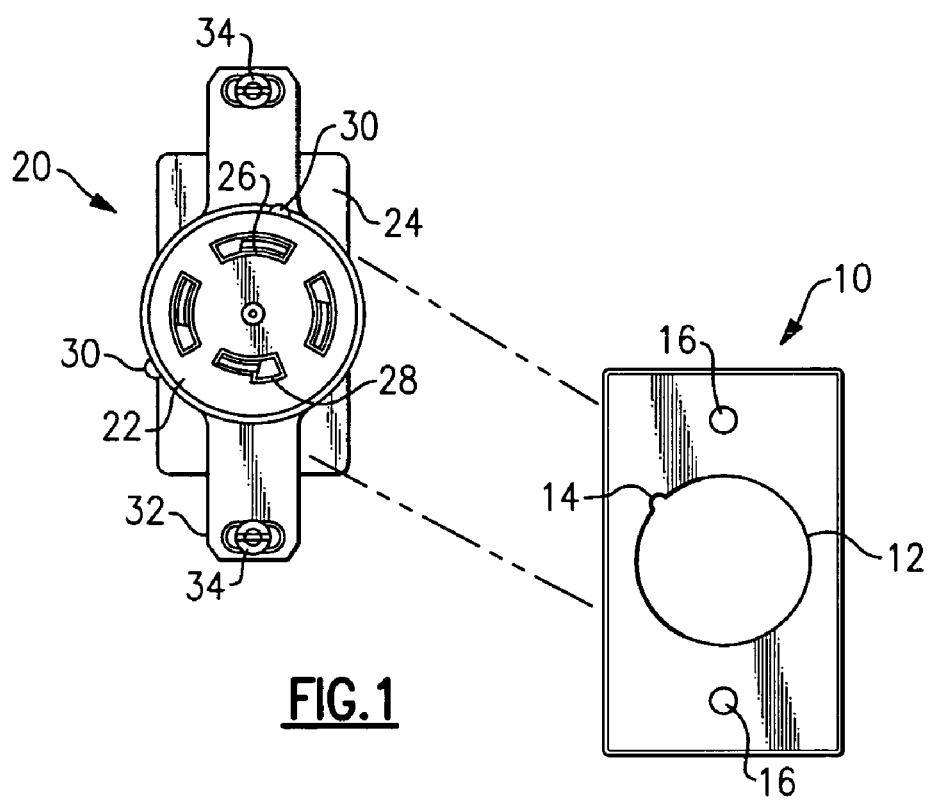
FIG. 1 shows the combination of the wall plate and the locking receptacle in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the wall plate of the present invention is shown in FIG. 1, and is designated generally throughout by reference numeral 10.

As embodied herein and depicted in FIG. 1, the combination of the wall plate 10 and the locking receptacle 20 in accordance with the present invention is disclosed. Wall plate 10 is a single gang wall plate that includes a screw hole 16 that is configured to mate with screws 34 such that wall plate 10 may be fixedly attached to receptacle 20. A central aperture 12 is sized to accommodate the neck portion 22 of locking receptacle 20. As is known in the art, the screw holes 16 are aligned along a longitudinal axis of the plate member such that the top screw hole is disposed at a twelve o'clock position relative to central aperture 12 and the second screw hole is disposed at a six o'clock position relative to central aperture 12. The central aperture 12 includes a notch 14. Notch 14 may be disposed between the six o'clock position and the twelve o'clock position and allows the wall plate 10 to be properly installed over the locking receptacle 20.

Locking receptacle 20 includes a base member 24, a raised circular neck member 22, which is coupled to the base member. The neck member 22 has a user-accessible receptacle disposed therein. Neck member 22 also includes one or more locking tabs 30 disposed in the side portion of neck 22. The base member 24 includes electrical terminals and contacts (not shown) as well as mounting strap 32. In the embodiment shown in FIG. 1, the locking receptacle 20 is configured to make an interlocked connection with a plug connected to a four-wire cable. As such, in this embodiment, device 20 requires four terminals. Accordingly, the raised circular neck member 22 includes four arcuate slots 26 formed therein. These slots are adapted to receive the plug contact prongs. One of the slots 28 includes a radially extending portion 28; this portion is configured to cooperate with a similarly shaped plug contact prong. Of course, those of ordinary skill in the art will understand that locking receptacle 20 may be configured to mate with a plug device having numbers of wires other than four, for example, two-wire or a three-wire system may also be employed. Regardless of the number of wires, when a plug is inserted into the arcuate slots, a relative rotation between the connector parts, i.e., the plug and receptacle, is effected until inter-locking occurs.

The wall plate is mounted by inserting one of the locking tabs 30 into the notch 14. The plate is rotated until the other lock tab 30 is aligned with the notch 14, and the second lock tab 30 is inserted into the notch 14. At this point the wall plate 10 may be pressed directly against the wall. Mounting screws 34 are then inserted into screw holes to complete the installation.

In one embodiment, central aperture 12 is a 2" circular hole configured to accommodate a California Standard receptacle. Notch 14 is approximately $7/32$" and is disposed at the 10 o'clock position relative to aperture 12. By making notch 14 slightly larger than $1/16^{th}$ inch, cover plate 10 may be installed properly over the locking receptacle 20. California Standard receptacles may include a nub/lock tab 30 at the one o'clock position and another lock tab 30 at the seven o'clock position.

Figure 2:
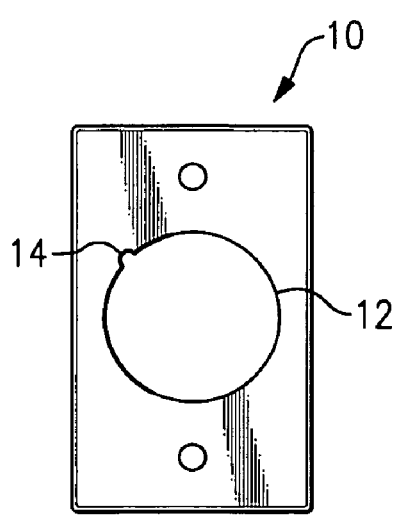
FIG. 2 is an illustration of a wall plate having a notch at the 11 o'clock position in accordance with the present invention.
Figure 3:
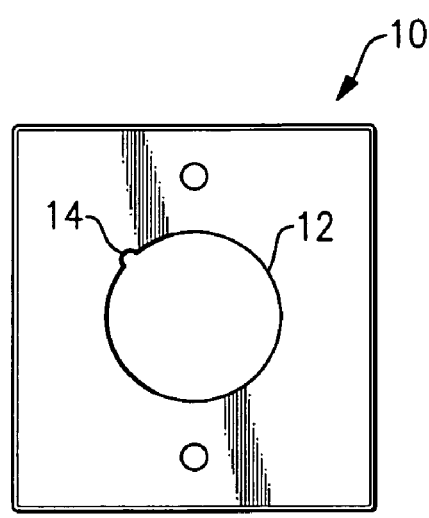
FIG. 3 is an illustration of a 2 gang wall plate having a notch at the 10 o'clock position.

FIG. 2 is an illustration of a single gang wall plate having a notch 14 at the 11 o'clock position. FIG. 3 is an illustration of a two-gang wall plate 10 having a notch 14 at the 10 o'clock position. The two-gang wall plate 10 in this design is relatively square. Those of ordinary skill in the art will appreciate that wall plate 10 may be formed from any suitable material. For example, wall plate 10 may be manufactured using plastic materials, polycarbonates, nylon materials, and/or metal materials, such as stainless steel. Accordingly, wall plate 10 may be formed by any suitable process such as injection molding, casting, stamping, and/or milling.

The receptacles 20 that may be used in combination with the wall plate 10 include, but are not limited to, 15 A, 20 A, 30 A, and 50 A locking receptacles. The locking receptacles may also accommodate 125V, 250V, 277 VAC, 347 VAC, 480 VAC, as well as 600 VAC. In one embodiment, the locking receptacle may be implemented as a 2-pole, 3-wire receptacle. In another embodiment, the locking receptacle may be implemented as a 3-pole, 4-wire receptacle. As noted above, the receptacle may be a 2-wire device as well.

Figure 4A:
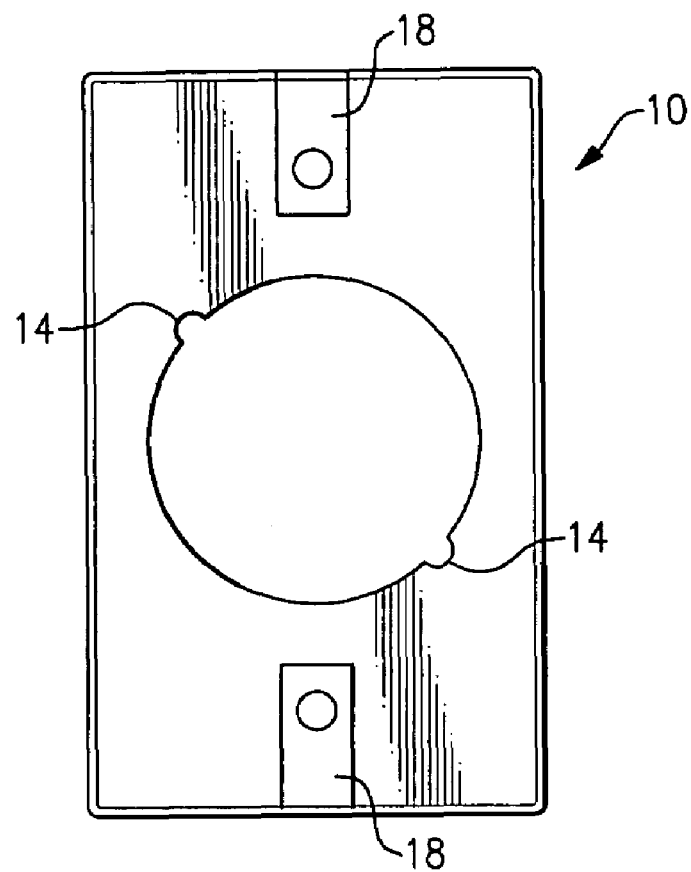
FIGS. 4A–4B are directed to a wall plate having a strap indentation in accordance with the present invention.
Figure 4B:
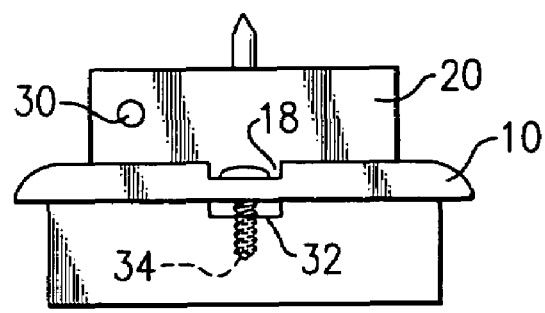

Referring to FIG. 4A, a wall strap 10 having a strap indentation 18 in accordance with the present invention is depicted. As shown, indentation 18 corresponds to strap 32 of the locking receptacle 20. In this embodiment, and indeed any of the embodiments of the present invention, may include two notches 14. The positioning of notches 14 may be altered such that they directly correspond to the positioning of locking nubs 30 on receptacle 20. This notch positioning allows the user to directly place the wall plate 10 over the receptacle 20 without having to rotate plate 10 during the installation process. FIG. 4B is a side view of the assembled wall plate/receptacle combination. Simply put, indentation 18 allows the screw head of screw 34 to be either flush with, or below, the major front surface area of wall plate 10.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A wall plate for covering a locking receptacle including a base member, the base member including a raised portion having a user-accessible receptacle and at least one locking tab disposed in a side portion thereof, the base member also including a mounting strap, the wall plate comprising:

a plate member having an aperture disposed therein, the aperture being sized to accommodate the raised portion;

at least one notch being disposed at a predetermined position along a periphery of the aperture, the at least one notch being sized to accommodate the at least one locking tab, whereby the user-accessible receptacle and the at least one locking tab are accessible to a user and the base member and the mounting strap are covered by the plate member and not accessible to a user; and wherein the plate includes a first screw hole and a second screw hole formed in the plate member, the first screw hole, the aperture, and the second screw hole being aligned along a longitudinal axis of the plate member such that the first screw hole is disposed at a twelve o'clock position relative to the aperture and the second screw hole is disposed at a six o'clock position relative to the aperture, the notch being disposed between the six o'clock position and the twelve o'clock position.

2. The plate of claim 1, wherein the at least one notch includes a dimension that is greater than or equal to approximately 1/16".

3. The plate of claim 2, wherein the at least one notch includes a dimension that is approximately 0.219 inches.

4. The plate of claim 1, wherein the plate is rectangular in shape.

5. The plate of claim 1, wherein the locking receptacle is a California Standard locking Receptacle.

6. The plate of claim 5, wherein the locking receptacle is a 50 A device.

7. The plate of claim 1, wherein the at least one locking tab includes a plurality of locking tabs.

8. The plate of claim 1, wherein the notch is disposed at an eleven o'clock position relative to the aperture.

9. The plate of claim 1, wherein the notch is disposed at a ten o'clock position relative to the aperture.

10. The plate of claim 1, further comprising a first indentation and a second indentation formed in a major frontal surface of the plate member, the first screw hole being disposed in the first indentation and the second screw hole being formed in the second indentation.

11. The plate of claim 1, wherein the at least one notch includes a first notch and a second notch disposed at separate predetermined positions along the periphery of the aperture.

12. The plate of claim 1, wherein the aperture has a diameter substantially equal to two inches.

13. An electrical assembly comprising:

a locking receptacle including a base member, the base member including a raised portion having at least one user-accessible receptacle disposed therein, the raised portion also including at least one locking tab disposed in a side portion thereof, the base member also including at least one terminal member and a mounting strap; and a wall plate including a plate member having an aperture disposed therein, the aperture being sized to accommodate the raised portion, a notch being disposed at a predetermined position along a periphery of the aperture and sized to accommodate the at least one locking tab, the wall plate being mounted to the locking receptacle by inserting the at least one locking tab into the notch and rotatably aligned with the locking receptacle such that the at least one user-accessible receptacle is disposed within the aperture and accessible to a user and the base member and the mounting strap are not accessible to the user.

14. The assembly of claim 13, wherein the locking receptacle is selected from a group of locking receptacles having current ratings that include a 15 A current rating, 20 A current rating, 30 A current rating and/or a 50 A current rating.

15. The assembly of claim 13, wherein the locking receptacle is selected from a group of locking receptacles having voltage ratings that include a 125 V voltage rating, a 250 V voltage rating, a 277 VAC voltage rating, a 347 VAC voltage rating, a 480 VAC voltage rating, and/or a 600 VAC voltage rating.

16. The assembly of claim 13, wherein the locking receptacle includes a 2-pole, 3-wire receptacle.

17. The assembly of claim 13, wherein the locking receptacle includes a 3-pole, 4-wire receptacle.

18. The assembly of claim 13, wherein the locking receptacle includes a 2-wire locking receptacle.

19. The assembly of claim 13, wherein the notch includes a dimension that is greater than or equal to approximately 1/16".

20. The assembly of claim 19, wherein the notch is disposed at an eleven o'clock position relative to the aperture.

21. The assembly of claim 19, wherein the notch is disposed at a ten o'clock position relative to the aperture.

22. The assembly of claim 13, wherein the aperture has a diameter substantially equal to two inches.

23. A method for mounting a wall plate to a locking receptacle, the method comprising:

mounting a locking receptacle to a structure, the locking receptacle including a base member, the base member including a raised portion having at least one user-accessible receptacle disposed therein, the raised portion also including a first locking tab and a second locking tab disposed at separate locations in a side portion of the raised portion, the base member including a mounting strap, whereby the mounting strap is connected to the structure;

providing a wall plate, the wall plate including a plate member having an aperture disposed therein and a notch disposed at a predetermined position at a periphery of the aperture, the aperture being sized to accommodate the raised portion, the notch being sized to accommodate the plurality of locking tabs;

insetting the first locking tab into the notch;

rotating the wall plate until the notch is aligned with the second locking tab; and inserting the second locking tab into the notch such that the neck portion is disposed within the aperture, whereby the user-accessible receptacle is accessible to a user and the base member and the mounting strap are covered by the plate member and not accessible to a user.

* * * * *